United States Patent Office 3,438,868
Patented Apr. 15, 1969

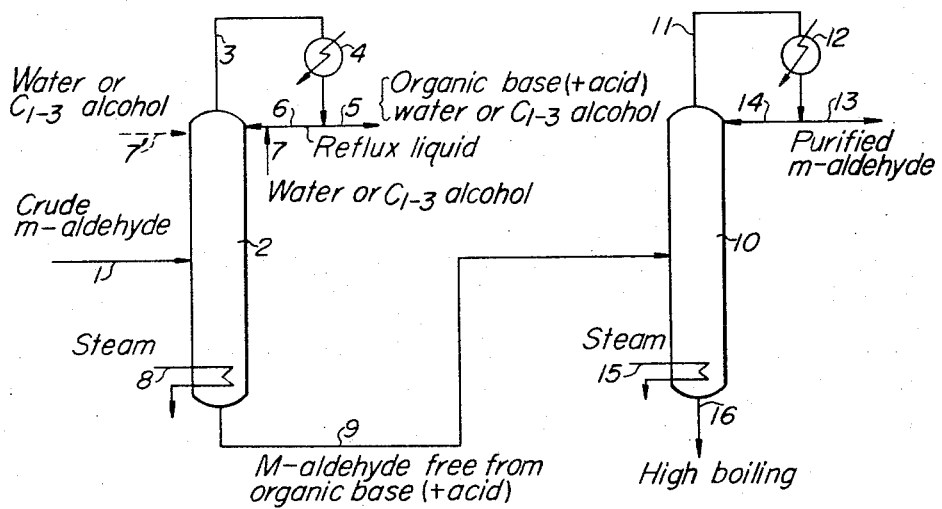

3,438,868
PROCESS FOR PURIFYING β-METHYLMERCAPTO-PROPIONALDEHYDE BY REDUCED PRESSURE DISTILLATION IN THE PRESENCE OF WATER OR A $C_1$ TO $C_3$ ALCOHOL
Yoshitsugu Sawaki, Katsuyoshi Tokunaga, Masao Sada, Mitsuyoshi Manabe, and Shigekatsu Kondo, Niihamashi, Japan, assignors to Sumitomo Chemical Company, Ltd., Osaka, Japan, a corporation of Japan
Filed Aug. 29, 1967, Ser. No. 663,995
Claims priority, application Japan, Feb. 2, 1966,
41/58,313
Int. Cl. C07c *149/02, 149/20;* B01d *3/34*
U.S. Cl. 203—8                                5 Claims

ABSTRACT OF THE DISCLOSURE

A process for purifying of β-methylmercaptopropionaldehyde which is an intermediate for the synthesis of methionine, an essential amino acid, in which organic bases contained in the β-methylmercaptopropionaldehyde are separated as low boilings by effecting the purification while adding water or an alcohol either to the reflux liquid or directly to the rectifier.

According to this process, the polymerization of β-methylmercaptopropionaldehyde during the purification can be inhibited.

This invention relates to an improved process for purifying β-methylmercaptopropionaldehyde (hereinafter referred to as "M-aldehyde"). More particularly, the invention is concerned with an improved method for rectifying a crude M-aldehyde containing, as an impurity, an organic base which is free or combined with acid, in which the M-aldehyde is purified in high yield by separating the organic base while charging water or an alcohol into the reflux liquid or directly into the rectifier.

M-aldehyde is an important compound as an intermediate for the synthesis of methionine, which is an essential amino acid.

Ordinarily, M-aldehyde is obtained by reacting acrolein with methylmercaptan in the presence of, as a catalyst, a free organic base or a combination of organic base and acid, such as pyridine or pyridine-acetic acid. In the above case, the resulting crude M-aldehyde comes to be incorporated with such impurities as catalyst components (the above-mentioned organic base and the like); unreacted acrolein and methylmercaptan; aldehyde, water and the like impurities which have been contained in said starting materials; and high boiling compounds such as dimers of M-aldehyde. These impurities have a great influence on the yield and purity of methionine to be produced and hence should have previously be removed from the M-aldehyde before use.

For the removal of such impurities, the crude M-aldehyde is ordinarily subjected to rectification. During the rectification, however, a part of the M-aldehyde is converted into high boiling compounds, and as much as 10–20% by weight of the M-aldehyde is lost, in some cases.

In order to overcome the above drawbacks, the present inventors made examination of said phenomenon to find that the conversion of M-aldehyde into high boiling compounds is due chiefly to the presence of organic bases in the M-aldehyde. This was confirmed by the present inventors according to the following experiment:

That is, when pure M-aldehyde was heated at 90° C. for 2 hours, only 0.47% by weight of the aldehyde was converted into high boiling compounds. However, when M-aldehyde containing 10% by weight of pyridine was treated under the same conditions as above, as much as 6.4% by weight of the M-aldehyde was lost. The presence of acetic acid and the like impurities did not result in such a marked loss as above.

In the rectification of crude M-aldehyde, therefore, it is necessary to remove the organic base as early as possible during the rectification. However, no sufficient result could be attained by mere removal of organic base at the initial stage of rectification. The present inventors found that the above was accountable to the fact that organic base being contained in low boiling components was concentrated as they ascended to the upper part of the rectifier, with the result that the M-aldehyde, which had ascended the rectifier, was promoted to be converted into high boiling compounds in said upper part of the rectifier.

The inventors made further examination to find the fact that the above difficulties can be overcome by adding, during the rectification of crude M-aldehyde, a certain medium to the reflux liquid or to the rectifier. Based on the above finding, the inventors have established a markedly advantageous process for the commercial scale purification of crude M-aldehyde.

An object of the present invention is to purify crude M-aldehyde in high yields while preventing the loss of M-aldehyde due to polymerization.

Other objects will be apparent from the following descriptions.

In order to accomplish these objects, the present invention provides a process for purifying crude M-aldehyde by rectifying under reduced pressure crude M-aldehyde containing an organic base which is free or combined with acid and is capable of being separated as low boiling component from the M-aldehyde, characterized by the fact that said organic base is separated as a low boiling component by effecting the rectification while lowering the concentration of said organic base in the reflux liquid to below about 25% by weight based on the weight of the reflux liquid by addition of water, an alcohol which is separable as a low boiling component from the M-aldehyde or a mixture thereof to said reflux liquid or directly to the rectifier, and M-aldehyde freed from said organic base is retained in the residual liquid fraction.

The figure is a schematic view showing an embodiment of the present invention, which can be further explained by reference thereto. Crude M-aldehyde containing an organic base as an impurity is fed to rectifier 2 through line 1. Said crude M-aldehyde is rectified by supplying steam to line 8. Low boiling vapor is distilled off from line 3. The boiling vapor consists mainly of organic base, water or alcohol added to the rectifier according to the present process, and a small amount of M-aldehyde. Crude M-aldehyde, synthesized using not only the organic base but also organic base and acid as a catalyst, can be supplied to the rectifier through the line. In that case, acid sometimes distills off in addition to said components. The low boiling vapor is condensed in condenser 4. Part of the condensate is withdrawn through line 5, and the remaining part of the condensate is recycled to the rectifier through line 6 as a reflux liquid.

Water or alcohol is added to the reflux liquid of line 6 through line 7, and fed together to rectifier 2. In that case, water or alcohol may be supplied directly to the rectifier through line 7'. Water or alcohol may be added in any other manner.

In this way, M-aldehyde free from the organic base can be obtained through line 9, and can be used, as it is, in synthesis of methionine.

However, if higher boiling materials are involved in said M-aldehyde, said M-aldehyde is introduced into a finisher 10 to rectify the same. Steam is supplied to line 15, and M-aldehyde from line 9 is rectified. M-aldehyde vapor is distilled off from line 11, and condensed in condenser 12. Part of the condenser is recycled to the finisher 10. Purified M-aldehyde is withdrawn from line 13. Higher boiling materials are withdrawn from line 16 and discarded.

In the present process, organic base is first removed at as early a stage as possible during the rectification. Therefore, the present invention is applied to crude M-aldehyde containing organic base separable as low boiling components from the M-aldehyde. Said organic base may be one which is free or combined with acid, such as piperidine, pyridine, triethylamine or pyridine-acetic acid. Such low boiling catalysts should have been used at the synthesis stage of crude M-aldehyde.

According to the present invention, the polymerization of M-aldehyde during the rectification can be overcome by adding water or an alcohol either to the reflux liquid or directly to the rectifier. Further, in case the starting acrolein is separated as low boiling component, the polymerization of the separated acrolein can also be inhibited.

The alcohol to be used may be any of those lower in boiling point than the M-aldehyde, such as for example, methyl alcohol, ethyl alcohol or isopropyl alcohol.

Of course, the use of water is the most economical.

Such alcohol or water may be added either to the reflux liquid or directly to the rectifier. In the latter case, the medium may be added through any position of the rectifier, preferably through a position between the inlet for crude M-aldehyde and the top of the rectifier. It is effective to feed the medium particularly to a portion at which the concentration of organic base in the rectifier is the highest. Alternatively, the medium may be fed to the rectifier in such a state that it has previously incorporated into crude M-aldehyde.

The medium may be added continuously or intermittently.

The amount of the medium to be added may be such as to lower the organic base concentration in the reflux liquid to less than about 25% by weight, preferably to less than about 20% by weight. The concentration of the organic base becomes higher, the easier becomes the formation of high boiling compounds.

The rectification is desirably effected under reduced pressure below 280 mm Hg abs., preferably 75 mm Hg abs. and it is desirable that the temperature at the still of the rectifier be below 130° C., preferably below 100° C.

In the above manner, the organic base is distilled in free state or in state combined with acid, together with other low boiling impurities such as unreacted acrolein and acetaldehyde, and with the vapor of said medium added.

The M-aldehyde thus freed from said impurities may further be treated in another rectifier or distillator to remove high boiling compounds. This treatment may of course be omitted because little high boiling compounds are formed when the present process is adopted.

Thus, in accordance with the present process, the purification of M-aldehyde can be effected with commercial advantages almost without causing any loss of M-aldehyde.

The following example illustrates the present invention, but the invention is by no means limited to the example.

EXAMPLE

The rectifier employed had an exhausting section of 4 cm. in diameter and 42 cm. in McMahon packed length and an enriching section comprising a McMahon packed portion of 4 cm. in diameter and 30 cm. in packed length.

Separately, two kinds of crude M-aldehydes A and B as shown in Table 1 were synthesized from crude acrolein and methylmercaptan, using acetic acid-pyridine as catalyst.

To the above-mentioned rectifier, each of the thus synthesized crude M-aldehydes was continuously fed at a rate of 1.5 l. per hour to remove low boiling impurities. The rectification conditions were such that the still was maintained under a reduced pressure of 26 mm Hg. and the top portion was maintained at 20° C. to the reflux liquid. In this case, the amount of added water or isopropyl added to lower the concentration of catalyst in the reflux liquid. In this case, the amount of added water or isopropyl alcohol, the composition of reflux liquid, the composition of bottom liquid and the loss of M-aldehyde during the rectification were as shown in Table 2.

TABLE 1.—COMPOSITION OF CRUDE M-ALDEHYDE (WT. PERCENT)

| | M-aldehyde | Acetaldehyde | Acrolein | Water | Acetic acid | Pyridine | High boiling impurities |
|---|---|---|---|---|---|---|---|
| A | 87.0 | 8.5 | 0.8 | 1.4 | 0.6 | 0.5 | 1.2 |
| B | 78.3 | 8.3 | 0.5 | 1.6 | 0.1 | 0.9 | 10.3 |

TABLE 2

| Run No. | Crude M-aldehyde | Amount of added water or isopropyl alcohol (g./hr.) | Composition of reflux liquid (wt. percent) | | | | | Composition of bottom liquid (wt. percent) | | Loss of M aldehyde during rectification (wt. percent) |
|---|---|---|---|---|---|---|---|---|---|---|
| | | | M-aldehyde | Acetic acid | Pyridine | Water | Isopropyl alcohol | M-aldehyde | High boiling impurities | |
| 1 | A | 0 | 3.8 | 31.8 | 26.3 | 37.2 | | 90.8 | 9.1 | 7.9 |
| 2 | A | ¹ 50 | 4.4 | 11.3 | 9.3 | 73.7 | | 97.4 | 2.5 | 1.5 |
| 3 | A | ¹ 100 | 4.5 | 6.8 | 5.6 | 81.3 | | 97.4 | 2.5 | 1.6 |
| 4 | B | ² 50 | 0.7 | 12.7 | 10.5 | 14.9 | 54.5 | 97.3 | 2.7 | 1.4 |
| 5 | B | 0 | 4.4 | 5.4 | 47.1 | 42.1 | | 80.0 | 19.9 | 8.5 |
| 6 | B | ¹ 50 | 4.6 | 1.9 | 16.9 | 75.3 | | 86.8 | 13.1 | 1.8 |

¹ Water.   ² Isopropyl alcohol.

The same results as run No. 3 were obtained when crude M-aldehyde was rectified by the same manner as in run No. 3, except that water was added to the portion 5 cm. below from the top of the enriching section in place of added to the reflux liquid.

We claim:

1. A process for purifying crude β-methylmercaptopropionaldehyde by rectifying under reduced pressure crude β-methylmercaptopropionaldehyde containing, as an impurity to be removed, an organic base which is capable of being separated as low boiling component, said process comprising the steps of separating said organic base as a low boiling component by effecting the rectification while lowering the concentration of said organic base in a reflux liquid to below about 25% by weight based on the weight of the reflux liquid by adding at least one component selected from the group consisting of water, methylalcohol, ethylalcohol and propanols to the rectifier, and obtaining β - methylmercaptopropionaldehyde free from said organic base as the residue.

2. A process according to claim 1 wherein said organic base is one which is combined with acid.

3. A process according to claim 1 wherein said component is added to the reflux liquid.

4. A process according to claim 1, wherein said crude β-methylmercaptopropionaldehyde is rectified under reduced pressure below 280 mm. Hg abs. and at the bottom temperature of rectifier below 130° C.

5. A process according to claim 1, wherein said β-methylmercaptopropionaldehyde freed from said organic base is further rectified to separate β-methylmercaptopropionaldehyde in the distillate from a higher boiling compound than said aldehyde.

References Cited

UNITED STATES PATENTS

| | | | |
|---|---|---|---|
| 1,556,067 | 10/1925 | Bogin | 203—8 |
| 2,485,236 | 10/1949 | Gresham et al. | 260—601 |
| 2,584,496 | 2/1952 | Pierson et al. | 260—601 |
| 2,626,282 | 1/1953 | Cunningham et al. | 260—601 |
| 3,131,210 | 4/1964 | Hugel et al. | 260—601 |

WILBUR L. BASCOMB, Jr., *Primary Examiner.*

U.S. Cl. X.R.

203—55, 63, 79, 80, 91, 92, 95, 96; 260—601

UNITED STATES PATENT OFFICE
CERTIFICATE OF CORRECTION

Patent No. 3,438,868          Dated April 15, 1969

Inventor(s) Yoshitsugu Sawaki et al.

It is certified that error appears in the above-identified patent and that said Letters Patent are hereby corrected as shown below:

Column 4, lines 32-33: change "to the reflux liquid. In this case, the amount of added water or isopropyl" to --To the reflux liquid at the top portion, water or isopropyl alcohol was--.

Signed and sealed this 18th day of July 1972.

(SEAL)
Attest:

EDWARD M. FLETCHER, JR.                ROBERT GOTTSCHALK
Attesting Officer                      Commissioner of Patents